United States Patent

Richards et al.

[11] Patent Number: 5,899,523
[45] Date of Patent: May 4, 1999

[54] RAIN-DEFLECTING TRIM MOLDING FOR USE ON CAMPING TYPE RECREATIONAL VEHICLES

[76] Inventors: Larry L. Richards, 6888 Newton Falls Rd.; Joseph A. Keppler, 4201 Webb Rd., both of Ravenna, Ohio 44266

[21] Appl. No.: 08/986,295

[22] Filed: Dec. 6, 1997

[51] Int. Cl.[6] .................................................. B60R 13/07
[52] U.S. Cl. .............................................. 296/213; 52/97
[58] Field of Search .................................. 296/213; 52/97

[56] References Cited

U.S. PATENT DOCUMENTS

| | | | |
|---|---|---|---|
| 874,510 | 12/1907 | Johnston | 52/97 |
| 2,696,280 | 12/1954 | Bourne et al. | 52/97 |
| 3,653,711 | 4/1972 | De Claire et al. | 296/213 |

FOREIGN PATENT DOCUMENTS 114519  5/1989  Japan ..................................... 296/213

*Primary Examiner*—Gary C. Hoge

[57] ABSTRACT

A downwardly sloped rain-deflecting trim molding with an attachment system that consists of two insert prongs that engage into existing camping type recreational vehicle molding rails. A concave cross-section opening from the insert prong side going inward toward the downwardly sloped rain-deflection portion, allowing clearance for the existing recreational vehicle molding attachment screws. A caulking channel between the top edge of the downwardly sloped rain-deflecting slope and the existing recreational vehicle molding. It is made by extruding poly vinyl chloride through a die cut in the shape of the rain-deflecting trim molding.

2 Claims, 2 Drawing Sheets

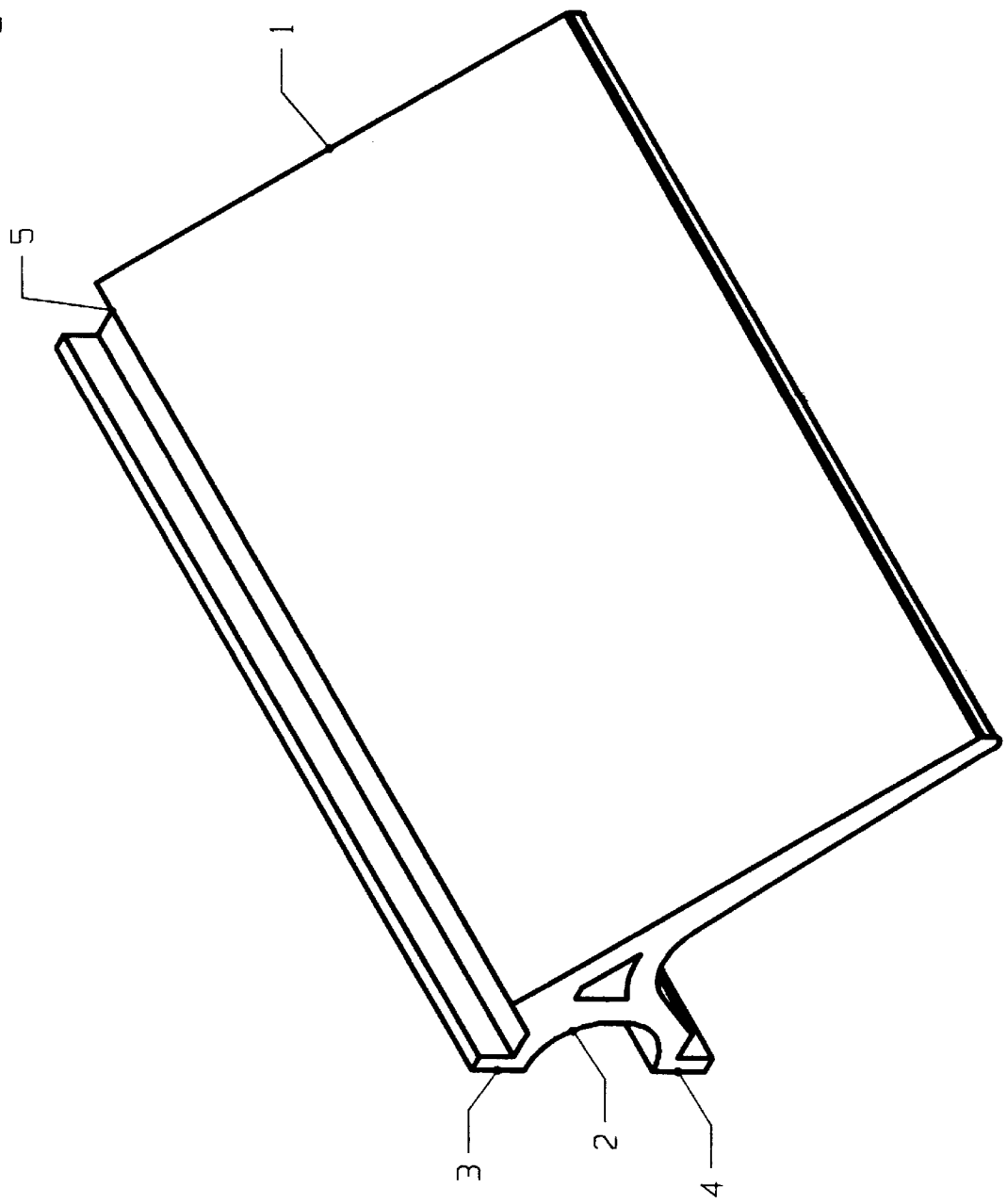

RAIN-DEFLECTING TRIM MOLDING FOR USE ON CAMPING TYPE RECREATIONAL VEHICLES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

A rain-deflecting trim molding designed to deflect rooftop water away from recreational vehicle siding, preventing black streaks caused from dirty rooftop water creeping down the siding. It attaches to existing recreational vehicle molding rail by two insert prongs. A concave opening or screw clearance arch between the prongs provides space to engage the rain-deflecting trim molding without interfering with the existing recreational vehicle molding attachment screws. A caulking channel at the top of the slope on the downwardly sloping rain-deflecting trim molding provides secure attachment to the existing recreation vehicle molding after engagement of the prongs. No prior art was found in our search of patents in Class-296 Land Vehicles, Bodies & Tops.

BRIEF SUMMARY OF THE INVENTION

The existing camping type recreational vehicle moldings allow dirty rooftop water to overflow onto the siding. This overflow of dirty water causes black streaks on the siding which are difficult to remove, after getting baked by the sun. The use of strong cleaners to remove the black streaks can be hard on the finish of the vehicle. These cleaners can also have a bad effect on our environment. This overflow also causes a higher likelihood of having a window leak from the water creeping over the windows.

The downwardly sloping rain-deflecting trim molding addition to the existing molding rail of a recreational vehicle allows the water runoff to extend out past the side and drop to the ground. Thus minimizing the rooftop water overflowing onto the siding, reducing black streaks and window leaks. It is a downward sloping overhang. The objects and advantages are:

(1) Minimizes the water overflow onto the side of these vehicles.
(2) Stops the sudden development of black streaks on these vehicles.
(3) Prevents the likelihood of window leaks.
(4) Minimizes the use of harsh cleaners which remove wax from the finish.
(5) Helps our environment by lessening the need for harsh chemicals.
(6) Is made from a Poly Vinyl Chloride which is recyclable.
(7) Is made out of a UV stabilized material for long life.
(8) Keeps these parked vehicles clean longer.
(9) Saves money by reducing the use of cleaners and waxes.
(10) Saves labor involved cleaning and waxing.
(11) Saves time by reducing the need for extensive cleaning and waxing.
(12) Is easily installed into the existing recreational vehicle molding rail.

BRIEF DESCRIPTION OF SEVERAL VIEWS OF THE DRAWING

FIG. 2 is a 3-D drawing of the rain-deflecting trim molding with named parts.

DETAILED DESCRIPTION OF THE INVENTION

Figure 1:
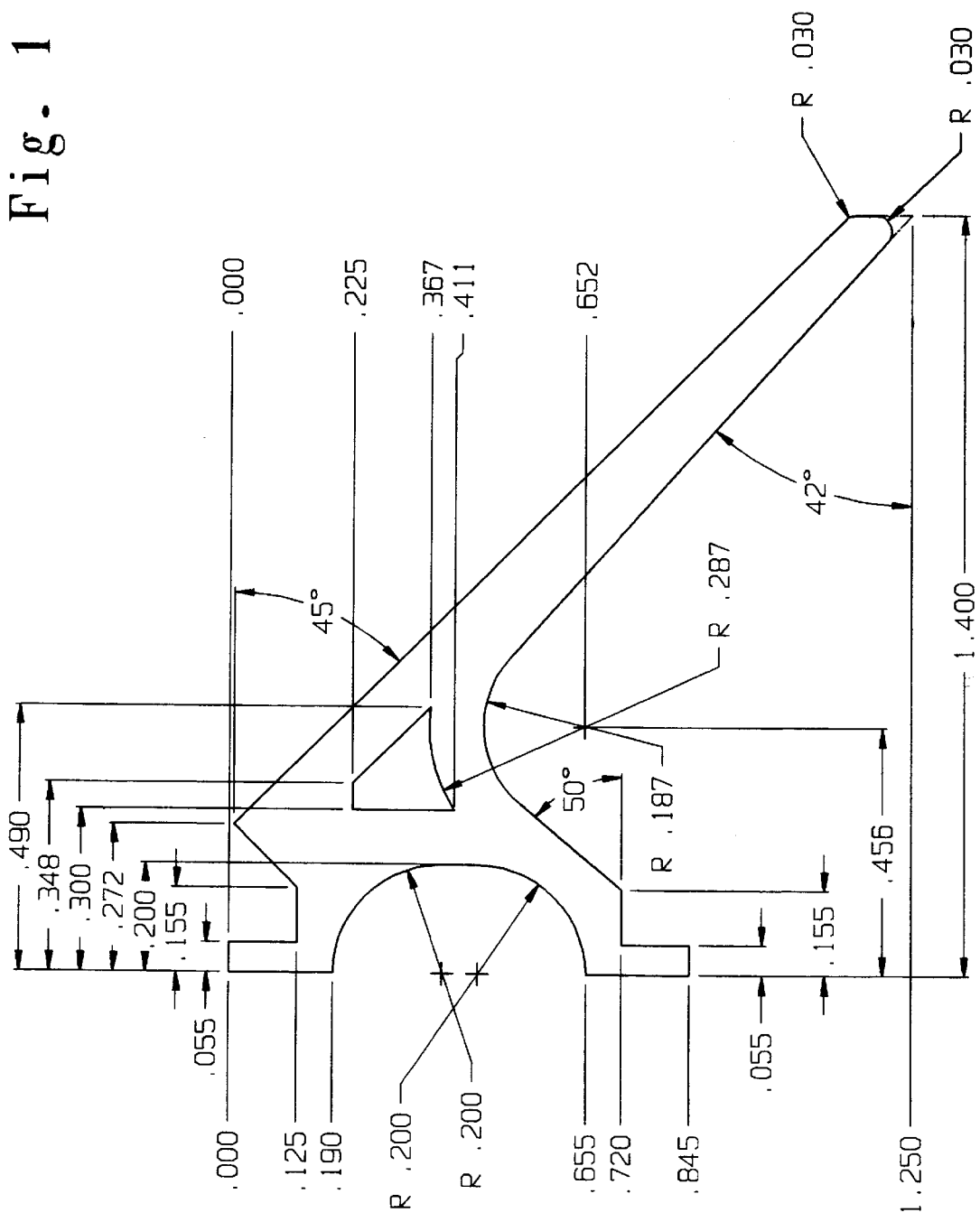
FIG. 1 is a dimensioned drawing of the rain-deflecting trim molding.

A rain-deflecting trim molding made from a UV stabilized poly vinyl chloride that extends the flow of rooftop water out past the side of the recreational vehicle.

It attaches by insertion of two insert prongs into the existing molding rails of a recreational vehicle There is a screw clearance arch to enable installation without interference of the existing molding attachment screws. The caulking channel provides additional rain-deflecting trim molding attachment security to the existing molding.

It is manufactured by extruding the material through a die cut in the shape of the rain-deflecting trim molding with tolerances built into the die for the expected shrinkage of the material after curing.

FIG. 1 shows the dimensions of the rain-deflecting trim molding and FIG. 2 shows a 3-D drawing with the named parts.

Referring to FIG. 2, a downwardly sloping rain-deflection portion 1 used to extend the rooftop water past the recreational vehicle side. A screw clearance arch 2 to clear the existing recreational vehicle molding attachment screws. Two insert prongs 3 and 4 for engagement into the existing recreational vehicle molding rail. A caulking channel 5 for securing the downwardly sloping trim molding to the existing recreational vehicle molding after the two insert prongs 3 and 4 have been engaged into the existing recreational vehicle molding rail.

We claim:

1. A rain-deflecting trim molding for attachment to the existing molding rail of a recreational vehicle, the trim molding comprising:

an elongated, downwardly sloping, rain-deflection portion having a proximate end and a distal end;

a screw clearance portion formed on said proximate end of said rain-deflection portion, said screw clearance portion having a concave cross-section opening away from said proximate end of said rain-deflection portion;

a top end of said screw clearance portion terminating in a vertically upwardly oriented first insert prong, and a bottom end of said screw clearance portion terminating in a vertically downwardly oriented second insert prong, said insert prongs for engagement with said molding rail;

a caulking channel formed between said first insert prong and a portion of said proximate end of said rain-deflection portion.

2. The rain-deflecting trim molding of claim 1, wherein said molding is made of a UV stabilized polyvinyl chloride.

* * * * *